United States Patent
Shiozawa

(10) Patent No.: US 7,272,389 B2
(45) Date of Patent: Sep. 18, 2007

(54) WIRELESS COMMUNICATION APPARATUS FOR USE IN COMMUNICATION USING IDENTIFICATION DATA

(75) Inventor: Tatsuo Shiozawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 95 days.

(21) Appl. No.: 11/196,391

(22) Filed: Aug. 4, 2005

(65) Prior Publication Data
US 2006/0046654 A1 Mar. 2, 2006

(30) Foreign Application Priority Data
Sep. 2, 2004 (JP) .............................. 2004-255828

(51) Int. Cl.
*H04M 3/00* (2006.01)
*H04B 7/00* (2006.01)

(52) U.S. Cl. ...................... 455/419; 455/420; 455/41.2

(58) Field of Classification Search .............. 455/41.2, 455/432.1, 422.1, 428, 419, 420
See application file for complete search history.

(56) References Cited

U.S. PATENT DOCUMENTS

2004/0249925 A1* 12/2004 Jeon et al. .................. 709/223

2006/0140404 A1* 6/2006 Oyama ....................... 380/201

FOREIGN PATENT DOCUMENTS

| JP | 11-8625 | 1/1999 |
| JP | 2001-238238 | 8/2001 |

* cited by examiner

*Primary Examiner*—Barry Taylor
(74) *Attorney, Agent, or Firm*—Oblon, Spivak, McClelland, Maier & Neustadt, P.C.

(57) ABSTRACT

A wireless communication apparatus that communicates between first and second wireless communication apparatuses. The second wireless communication apparatus includes a storage unit for storing group ID, a switch for giving instructions of setting up group ID, a transmission/reception unit for transmitting group ID read out from the storage unit to the first wireless communication apparatus to be put together in a group, and receiving a setting up completion signal transmitted from the first wireless communication apparatus, and a control unit for, reading out the group ID from the storage unit to send thus read out group ID to the transmission/reception unit when the switch is operated, and the control unit compares group ID transmitted from the first wireless communication apparatus and the group ID stored in the storage unit when the transmission/reception unit receives the setting up completion signal.

20 Claims, 10 Drawing Sheets

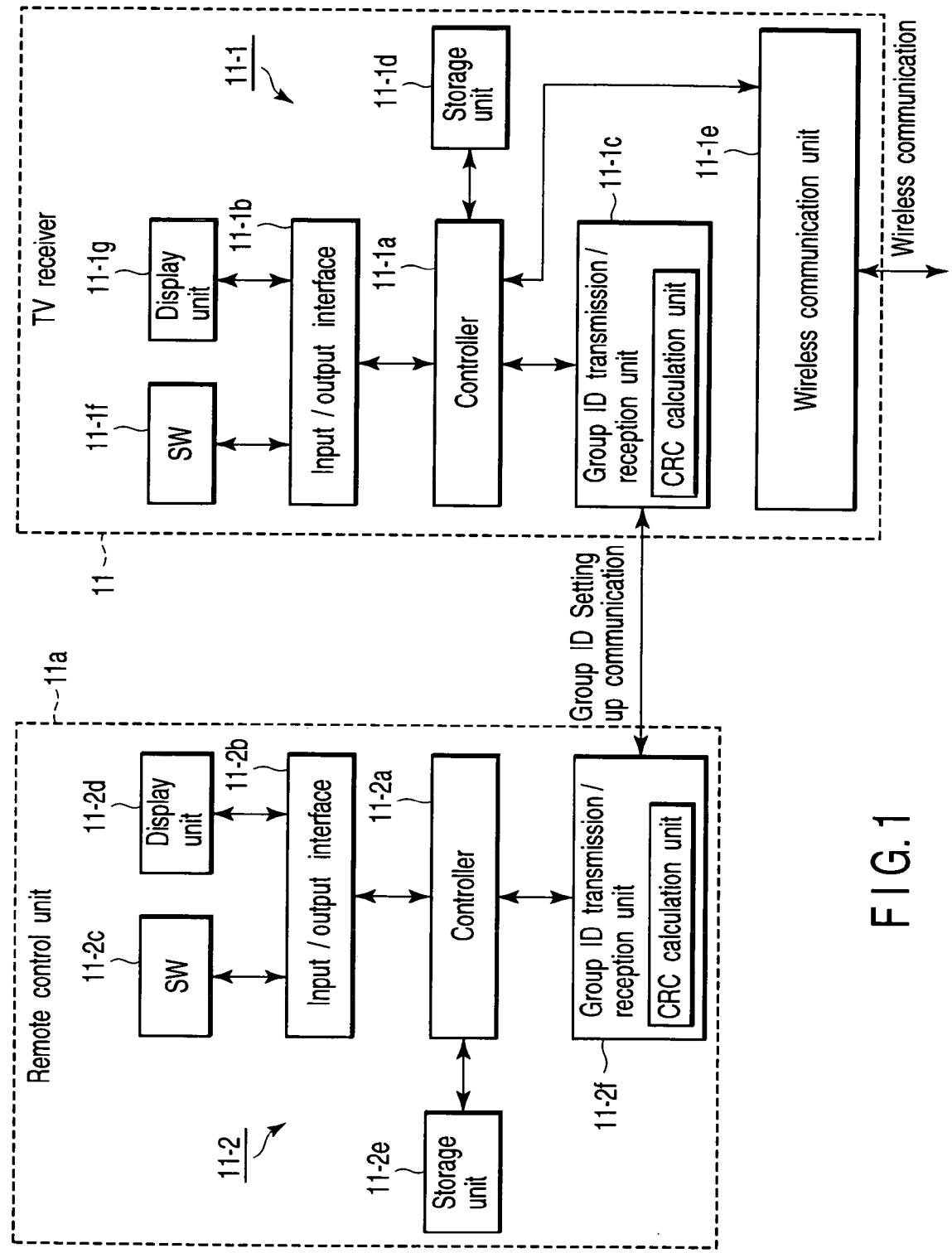
F I G. 1

| Command format | Contents |
|---|---|
| 0 0 | Setting up |
| 0 1 | Confirmation |
| 1 0 | Completion |
| 1 1 | Failure |

WIRELESS COMMUNICATION APPARATUS FOR USE IN COMMUNICATION USING IDENTIFICATION DATA

CROSS-REFERENCE TO RELATED APPLICATIONS

This application is based upon and claims the benefit of priority from prior Japanese Patent Application No. 2004-255828, filed Sep. 2, 2004, the entire contents of which are incorporated herein by reference.

BACKGROUND OF THE INVENTION

1. Field of the Invention

The present invention relates to a wireless local area network (LAN), and more particularly, to a wireless communication apparatus that transmits information within a group that is identified using identification data (ID).

2. Description of the Related Art

Recently, wireless LANs using radio or infrared light have been developed. In wireless data transmission conforming to the IEEE 802.11 standard, when receiving a wireless communication frame, a wireless communication apparatus selects a frame necessary for wireless communication and receives thus selected frame. Of ID for use in selecting a frame, there is group identification ID (referred to as group ID, hereinafter) used to identify a group. In a wireless communication system, so as to normally transmit and receive a frame, group ID of a group has to be correctly set up in a wireless communication apparatus, to which group the wireless communication apparatus belongs.

As methods to set up group ID, conventionally, there have been proposed two methods. One of the methods is, in a wireless communication apparatus having a character input unit such as a keyboard, to set up group ID in the wireless communication apparatus using the character input unit (see, for example, Jpn. Pat. Appln. KOKAI Publication No. 2001-238238). The other is to set up group ID in a wireless communication apparatus in advance when shipping the wireless communication apparatus from a plant.

In case of setting up group ID in a plurality of wireless communication apparatuses using a personal computer provided with a keyboard etc., arbitrary group ID can be set up or changed accordingly. However, it is troublesome to set up group ID using a keyboard, and there is a fear that group ID is incorrectly set up. Furthermore, in the method of setting up group ID using a character input unit such as a keyboard, in case a wireless communication apparatus is not provided with a character input unit, a character input unit has to be additionally coupled to the wireless communication apparatus, which undesirably requires hardware cost. Moreover, in the case of the Jpn. Pat. Appln. KOKAI Publication No. 2001-238238, identification numbers of communication partners have to be known beforehand.

In case of setting up group ID in wireless communication apparatuses in advance when shipping the wireless communication apparatuses, there is no fear that group ID is incorrectly set up. However, since an arbitrary group cannot be set up using previously set up group ID, the user cannot perform wireless communication with other various wireless communication apparatuses, and it is difficult to change or reconstruct the wireless communication system.

Furthermore, there is being developed an apparatus that sets up a group identification code in wireless communication units coupled to a plurality of computers respectively (see, for example, Jpn. Pat. Appln. KOKAI Publication No. 11-8625). This apparatus generates a group identification code using a manufacture's serial number, etc., in a wireless communication unit, and transmits thus generated group identification code to another wireless communication unit connected thereto by cable, wireless or optical communication to set up a common group identification code between both wireless communication units. However, this apparatus has to generate a group identification code in a wireless communication unit, and there is a fear that the same group identification code as an existing group identification code is accidentally generated.

BRIEF SUMMARY OF THE INVENTION

According to a first aspect of the invention, there is provided a wireless communication apparatus comprising: a first wireless communication apparatus; and a second wireless communication apparatus; the second wireless communication apparatus including: a storage unit which stores group identification data set up in advance; a switch which gives instructions of setting up and changing group identification data; a transmission/reception unit which transmits group identification data read out from the storage unit to the first wireless communication apparatus to be put together in a group by wireless communication, and receives a setting up completion signal transmitted from the first wireless communication apparatus; and a control unit which supplies the group identification data from the storage unit to the transmission/reception unit when the switch is operated, the control unit compares the group identification data transmitted from the first wireless communication apparatus and the group identification data stored in the storage unit when the transmission/reception unit receives the setting up completion signal, and confirms the setting up by a comparing result.

According to a second aspect of the invention, there is provided a wireless communication apparatus comprising: a plurality of first wireless communication apparatuses which include a first transmission/reception unit and a second transmission/reception unit, and can perform wireless communication mutually using the first transmission/reception unit; and a second wireless communication apparatus that can perform wireless communication with the second transmission/reception unit of the plural first wireless communication apparatuses; the second wireless communication apparatus including: a storage unit which stores group identification data set up in advance; a switch which gives instructions of setting up and changing group identification data; a third transmission/reception unit which transmits group identification data read out from the storage unit to the first wireless communication apparatus to be put together in a group, and receives a setting up completion signal transmitted from the second transmission/reception unit of the first wireless communication apparatus; and a control unit which, reads out the group identification data from the storage unit to send thus read out group identification data to the third transmission/reception unit when the switch is operated, the control unit compares group identification data transmitted from the second transmission/reception unit and the group identification data stored in the storage unit when the setting up completion signal transmitted from the second transmission/reception unit is received in response to the group identification data output from the third transmission/reception unit, and confirms the setting up by a comparing result.

According to a third aspect of the invention, there is provided a wireless transmission system in which a first wireless communication apparatus having a first storage unit and a second wireless communication apparatus having a second storage unit communicate with each other, the system comprising: transmitting group identification data stored in the second storage unit in response to group identification request; temporarily storing the group identification data transmitted from the second wireless communication apparatus in the first storage unit of the first wireless communication apparatus; transmitting storage completion data including the group identification data from the first wireless communication apparatus when the group identification data is stored in the first storage unit; comparing the group identification data included in the storage completion data and the group identification data stored in the second storage unit when the second wireless communication apparatus receives the storage completion data from the first wireless communication apparatus, and transmitting a comparison completion signal when the both group identification data accord with each other; registering the group identification data stored in the first storage unit when the first wireless communication apparatus receives the comparison completion signal.

BRIEF DESCRIPTION OF THE SEVERAL VIEWS OF THE DRAWING

FIG. 1 shows a block diagram of an embodiment of the present invention;

DETAILED DESCRIPTION OF THE INVENTION

Embodiments of the present invention will further be described below with reference to the accompanying drawings.

Figure 2:
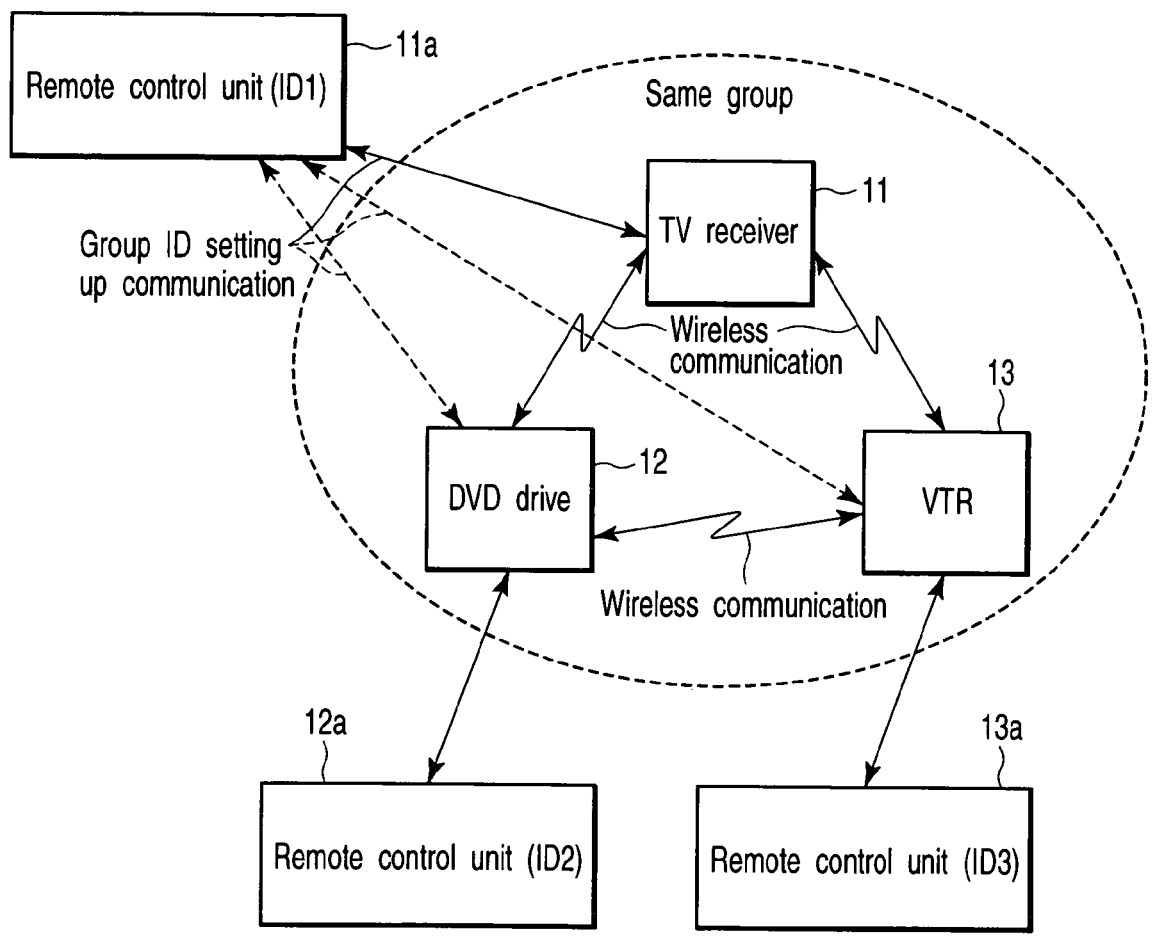
FIG. 2 shows a schematic view of an embodiment of the present invention.

FIG. 2 shows a schematic view of an embodiment of the present invention. In the embodiment, a wireless communication system includes first and second wireless communication apparatuses. The first wireless communication apparatuses (television [TV] receiver 11, digital versatile disk [DVD] drive 12, videotape recorder [VTR] 13 perform general wireless communication using group ID by employing infrared or radio communication. In contrast, the second wireless communication apparatuses (remote control units 11a, 12a, 13a) perform wireless communication to set up group ID between the second and the plural first wireless communication apparatuses. Consequently, the plural first wireless communication apparatuses, in which the same group ID is set up, can communicate with each other, and thus a wireless communication system conforming to the IEEE 802.11 standard is constructed.

In FIG. 2, as described above, home appliances provided with information processing capability (referred to as home information appliances, hereinafter) such as the TV receiver 11, DVD drive 12, and VTR 13 are provided with wireless communication capability conforming to the IEEE 802.11 standard, respectively. The TV receiver 11 has the remote control unit 11a for the TV receiver 11, and the DVD drive 12 has the remote control unit 12a for the DVD drive 12, and the VTR 13 has the remote control unit 13a for the VTR 13. These remote control units 11a, 12a, 13a are provided with wireless communication capability conforming to the IEEE 802.11 standard etc., respectively. Thus, the remote control unit 11a can communicate with the TV receiver 11, the remote control unit 12a can communicate with the DVD drive 12, and the remote control unit 13a can communicate with the VTR 13. When operating manual operation buttons, not shown, of the remote control units 11a, 12a, 13a, desired actions by corresponding apparatuses are carried out. That is, ID1 is set up in the TV receiver 11 and the remote control unit 11a as group ID when shipped from a plant, and ID2 is set up in the DVD drive 12 and the remote control unit 12a as group ID when shipped from a plant, and ID3 is set up in the VTR 13 and the remote control unit 13a as group ID when shipped from a plant. Thus, by operating the dedicated remote control unit, corresponding apparatus is operated.

In contrast, in this embodiment, the user can change the group of these apparatuses using the group ID which had been set up in these apparatuses in advance. For example, in case the user wants to put together the TV receiver 11, DVD drive 12, and VTR 13 in a group using the remote control unit 11a for the TV receiver 11, as shown by dotted lines in FIG. 2, the user firstly communicates with the DVD drive 12 using the remote control unit 11a to set up the ID1, which is set up in the remote control unit 11a, in the DVD drive 12. Then, the user communicates with the VTR 13 using the remote control unit 11a to set up the ID1, set up in the remote control unit 11a, in the VTR 13. As a result, the TV receiver 11, DVD drive 12, and VTR 13, whose group ID is different from each other when shipped from a plant, can have their group ID changed to the group ID (ID1) set up in the TV receiver 11. Thus, since the TV receiver 11, DVD drive 12, and VTR 13 come to have the same group ID, the TV receiver 11, DVD drive 12, and VTR 13 are put together in a group. Accordingly, mutual wireless communication among the TV receiver 11, DVD drive 12, and VTR 13 become possible.

In the above explanation, the TV receiver 11, DVD drive 12, and VTR 13 are put together in a group using the remote control unit 11a for the TV receiver 11 and the group ID (ID1) set up in the remote control unit 11a. In contrast, the remote control unit 12a for the DVD drive 12 may be used to put together the TV receiver 11, DVD drive 12, and VTR 13 in a group, while the remote control unit 13a for the VTR 13 may be used to put together the TV receiver 11, DVD drive 12, and VTR 13 in a group.

Figures 3A, 3B:
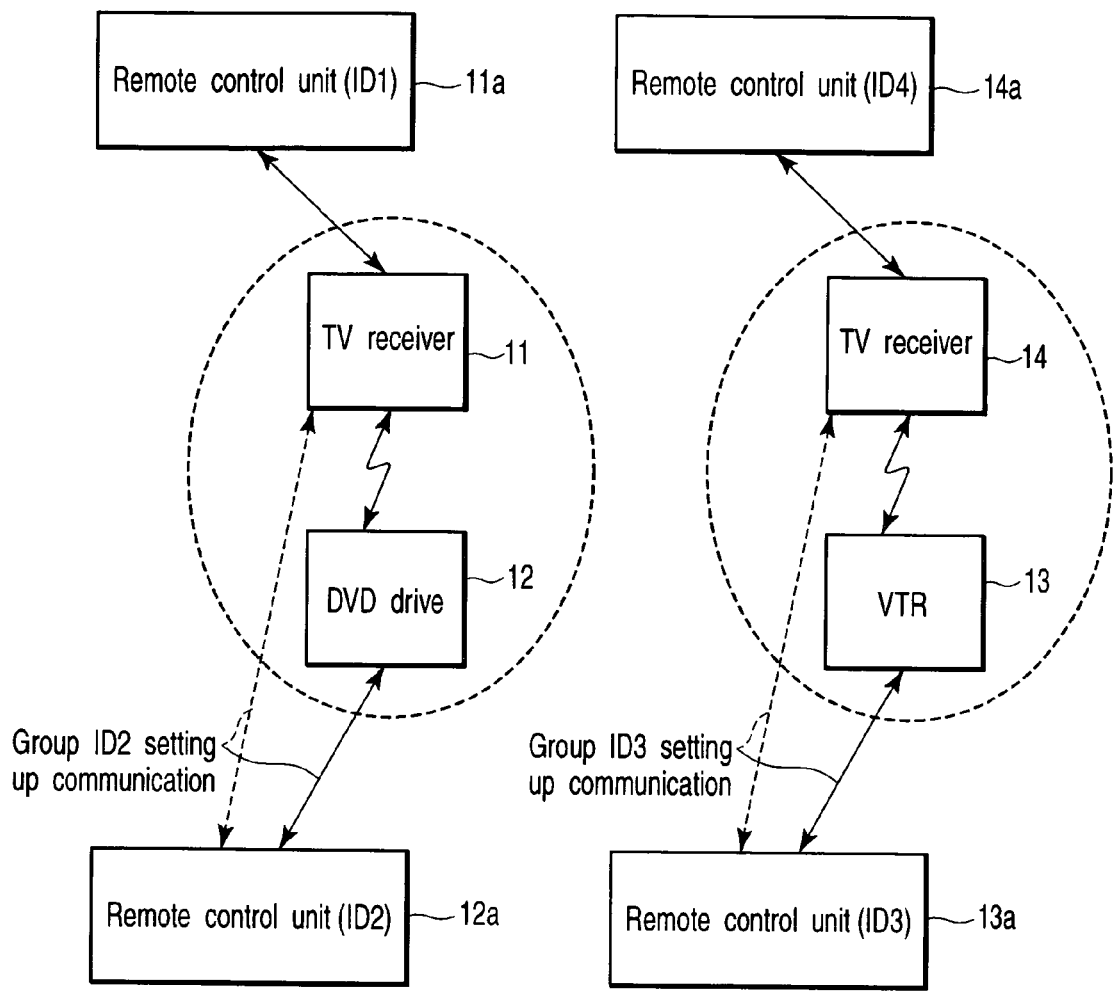
FIG. 3A and FIG. 3B show schematic views of other embodiments of the present invention.

FIG. 3A shows the case of putting together the TV receiver 11 and DVD drive 12 in a group using the remote control unit 12a for the DVD drive 12, while FIG. 3B shows the case of putting together a TV receiver 14 and the VTR 13 in a group using the remote control unit 13a for the VTR 13.

FIG. 1 shows an example of a wireless communication apparatus to be employed in the embodiment, and parts or components similar to those shown in FIG. 2, FIG. 3A, and FIG. 3B are indicated with the same reference numerals. In FIG. 1, a wireless communication apparatus 11-1 that is built in the TV receiver 11 is provided with wireless communication capability of two lines. That is, the wireless communication apparatus 11-1 has a wireless communication unit 11-1e that communicates with other home information appliances using group ID, and a group ID transmission/reception unit 11-1c to transmit and receive data to set up group ID.

The wireless communication apparatus 11-1 has a controller 11-1a that controls wireless communication of the TV receiver 11. The controller 11-1a is connected to an input/output interface 11-1b, the group ID transmission/reception unit 11-1c, a storage unit 11-1d, the wireless communication unit 11-1e. The controller 11-1a further has a temporary storage unit, to be described later, which temporarily stores the group ID.

To the input/output interface 11-1b, a plurality of switches, input terminals, and output terminals, not shown, are connected, and the performance of the TV receiver 11 is controlled depending on the operations by these switches, and input signals are received through the input terminals, while output signals are transmitted through the output terminals.

Furthermore, to the input/output interface 11-1b, a switch 11-1f that inputs a group ID registration request to make a transition into the state of receiving group ID, and a display unit 11-1g that displays the situation of transmitting group ID and registration result are connected.

The group ID transmission/reception unit 11-1c communicates with the remote control unit 11a. For example, the group ID transmission/reception unit 11-1c is a transmission/reception unit using infrared light, and has a cyclic redundancy check (CRC) calculation unit, and can transmit and receive data necessary for the operation of the TV receiver 11 and group ID.

The storage unit 11-1d may be a rewritable nonvolatile memory such as an EEPROM. In the storage unit 11-1d, predetermined group ID was stored when shipped from a plant.

The wireless communication unit 11-1e communicates with other home information appliances that are put together in a group using radio, etc. That is, the wireless communication unit 11-1e transmits and receives a frame generally using group ID stored in the storage unit 11-1d. Accordingly, the wireless communication apparatus 11-1 can mutually communicate with a plurality of home information appliances that are put together in a group under group ID.

In contrast, in the remote control unit 11a, a wireless communication apparatus 11-2 has a controller 11-2a, an input/output interface 11-2b, a switch 11-2c, a display unit 11-2d, a storage unit 11-2e, and a group ID transmission/reception unit 11-2f.

The switch 11-2c connected to the input/output interface 11-2b sends a group ID transmission request to the controller 11-2a to set up the wireless communication apparatus 11-2 in group ID transmission mode. The display unit 11-2d displays the situation of transmitting group ID and registration result.

The storage unit 11-2e may be a nonvolatile memory such as a ROM that stores group ID. The group ID was set up in advance when shipped from a plant.

The group ID transmission/reception unit 11-2f may be an infrared communication unit that has a CRC calculation unit.

Figures 4, 5:
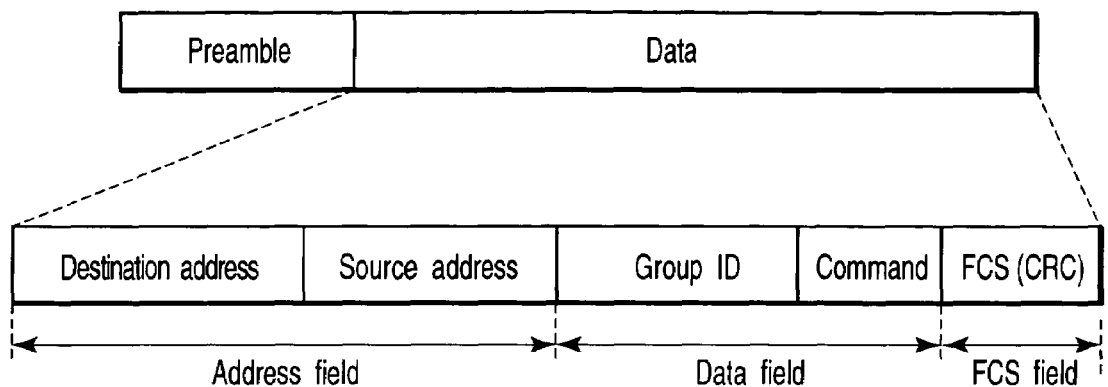
FIG. 4 shows an example of a transmission frame employed in the present invention.
FIG. 5 shows an example of the command format in the data field shown in FIG. 4.

FIG. 4 shows an example of the frame format that is used in transmitting group ID. The configuration of the frame format is not restricted to this. As shown in FIG. 4, a group ID transmission frame consists of preamble, to enable synchronization at a reception unit, and data, comprising transmission data. The data part has an address field, a data field, and a frame check sequence (FCS) field including a CRC. The address field has a destination address and a source address. The data field has group ID and a command. The FCS field is used to check the validity of the frame using the CRC.

FIG. 5 shows an example of the command format in the data field. The kind of the frame is determined by the command.

Figure 6:
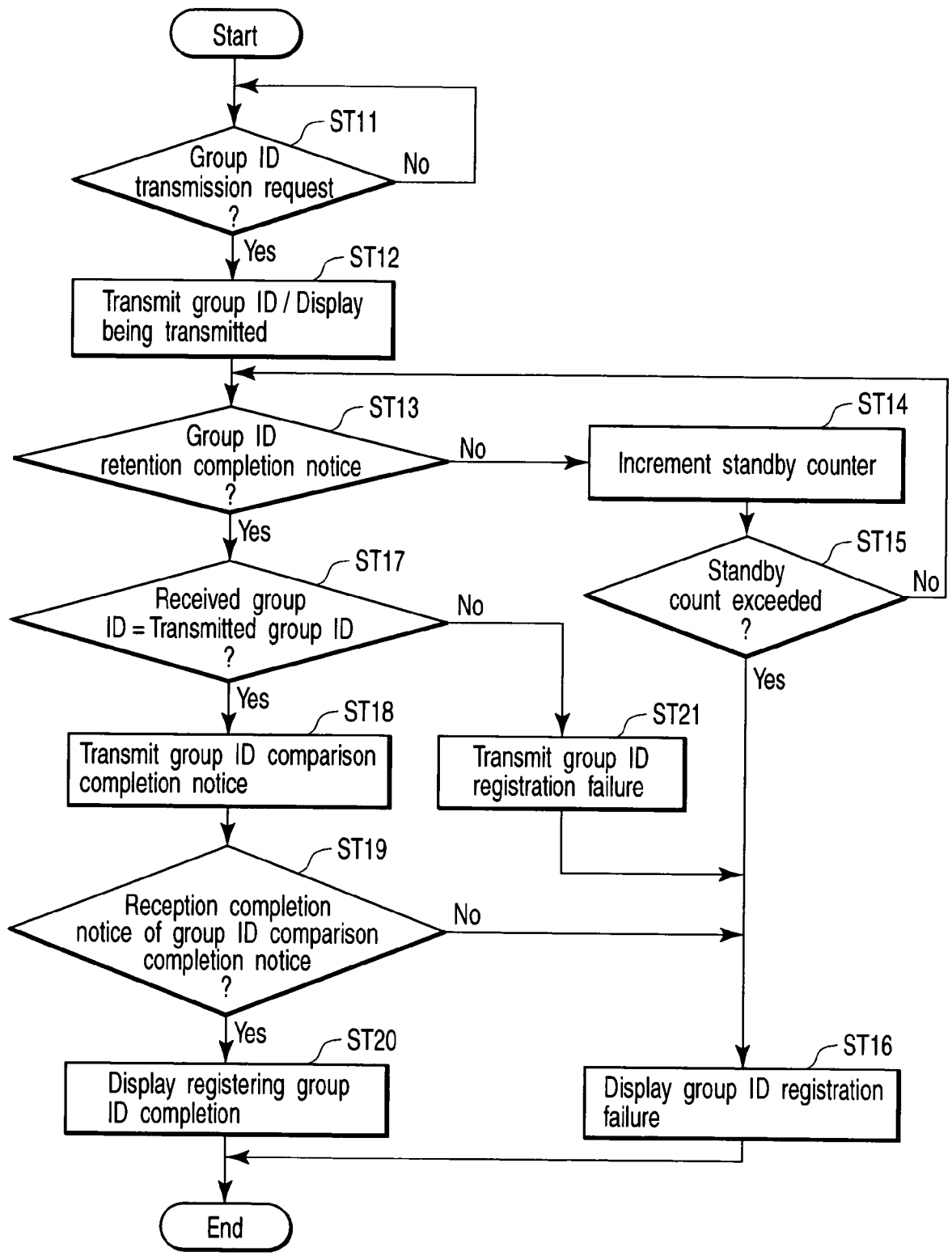
FIG. 6 is a flowchart indicative of the performance of a remote control unit 11a that transmits group ID.
Figure 7:
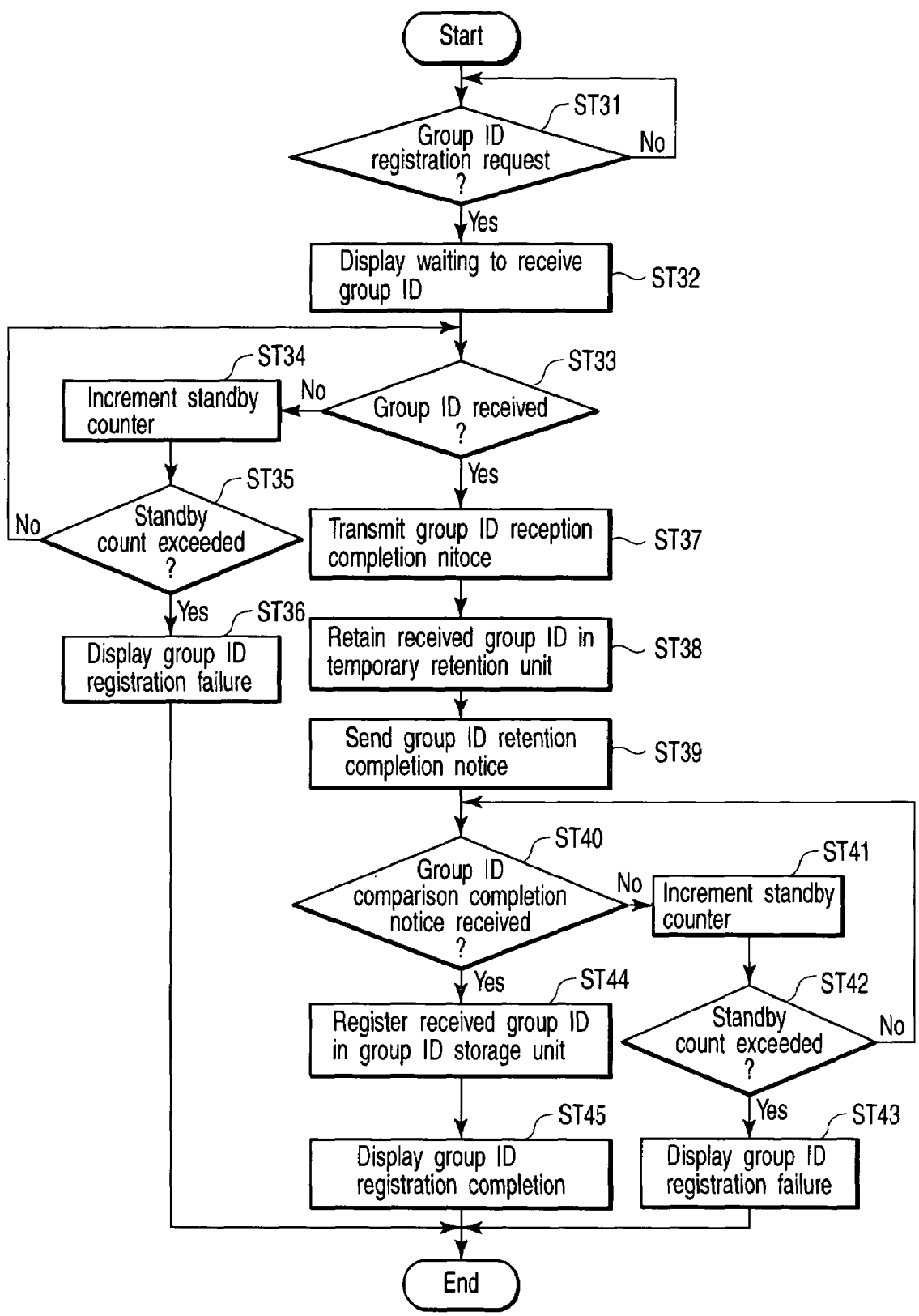
FIG. 7 is a flowchart indicative of the performance of a TV receiver 11 that receives group ID.
Figure 8:
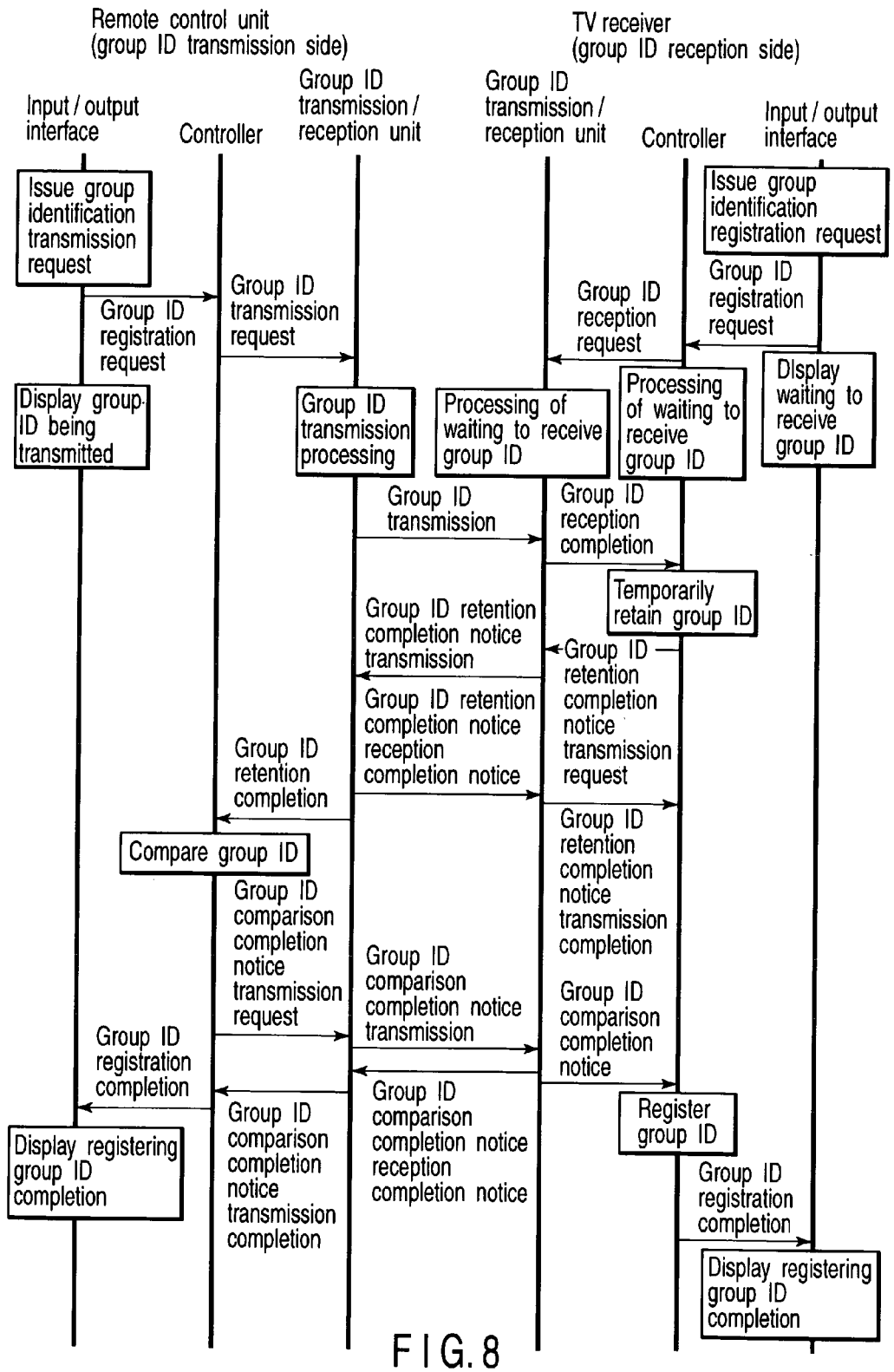
FIG. 8 shows a sequence chart at the time of registering group ID.
Figure 9:
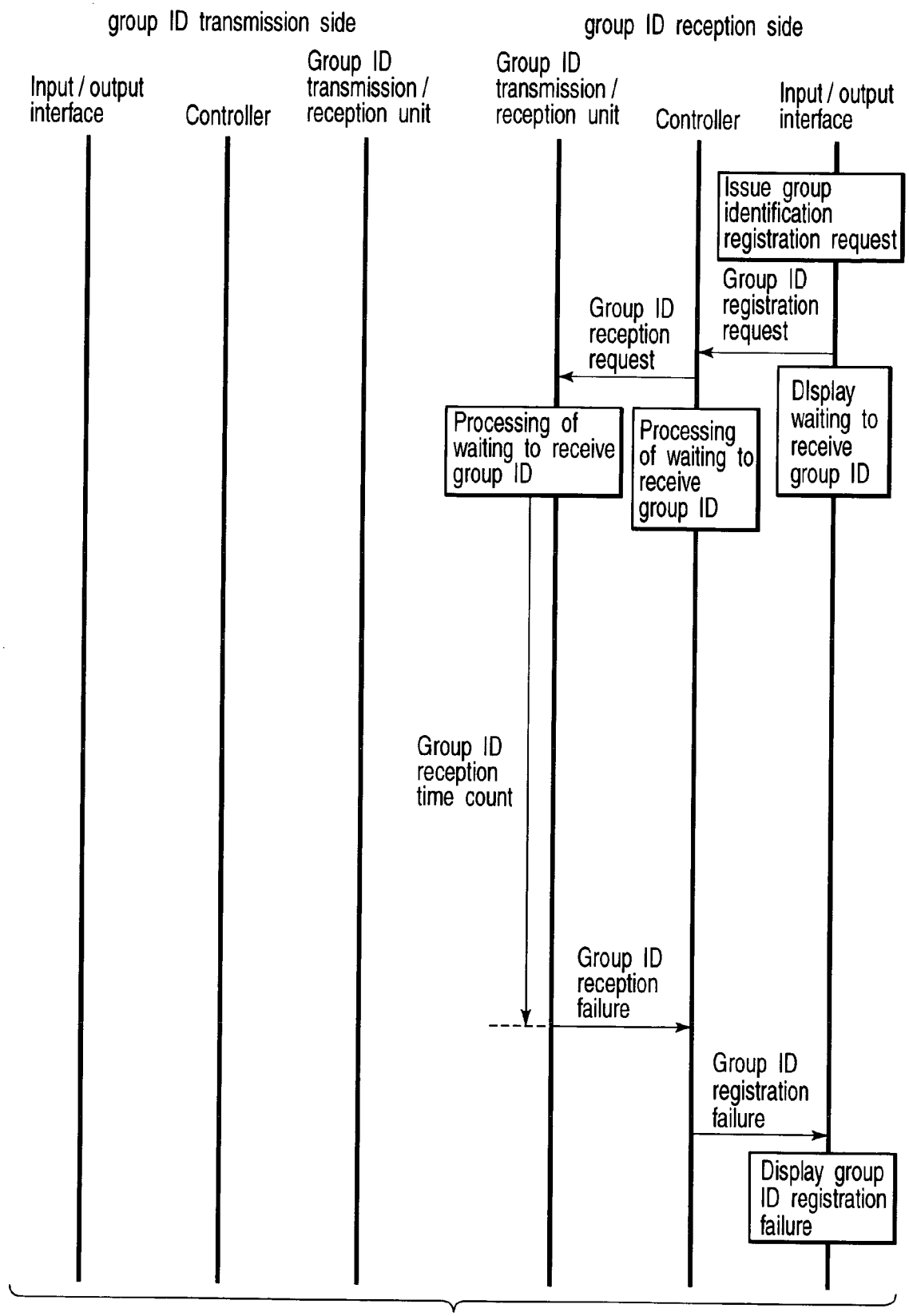
FIG. 9 shows a sequence chart in case registering group ID fails.

FIG. 6 shows a flowchart indicative of the performance of the remote control unit 11a that transmits group ID, while FIG. 7 shows a flow chart indicative of the performance of the TV receiver 11 that receives the group ID. Furthermore, FIG. 8 shows a sequence chart at the time of registering group ID, while FIG. 9 shows a sequence chart in case registering group ID fails. Furthermore, FIG. 10 shows another sequence chart in case registering group ID fails.

With reference to FIG. 6, FIG. 7, and FIG. 8, the performance of the case in which the remote control unit 11a transmits group ID to the TV receiver 11 and thus transmitted group ID is registered, will be explained.

<Performance of Remote Control Unit>

Figure 10:
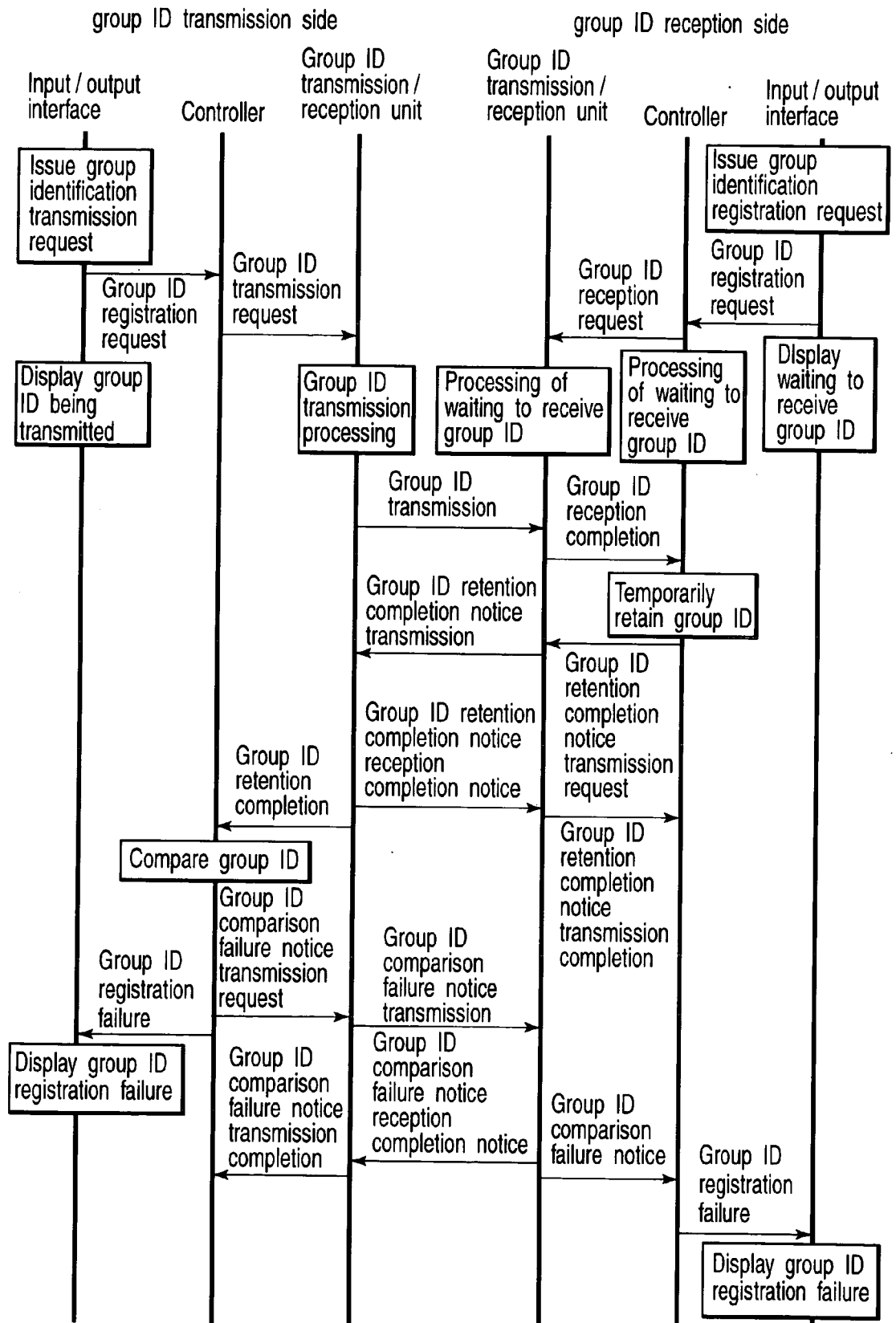
FIG. 10 shows a sequence chart in case registering group ID fails.

Firstly, with reference to FIG. 6, FIG. 8, and FIG. 10, the performance of the remote control unit 11a will be mainly explained.

In the remote control unit 11a, when the switch 11-2c is operated and a group ID transmission request signal is issued, the group ID transmission request signal is sent to the controller 11-2a through the input/output interface 11-2b (ST11).

The controller 11-2a reads out group ID from the storage unit 11-2e, and sends thus read out group ID and the group ID transmission request signal to the group ID transmission/reception unit 11-2f. Then, the group ID transmission/reception unit 11-2f transmits the group ID in accordance with the transmission frame shown in FIG. 4 (ST12). At this time, the command of the transmission frame is set to be "00" indicative of setting up. The frame that is used to transmit the group ID from the remote control unit 11a may be a broadcast frame. Furthermore, the controller 11-2a outputs a display signal indicating that the group ID is being transmitted in response to the group ID transmission request signal. The display signal is sent to the display unit 11-2d through the input/output interface 11-2b, and the display unit 11-2d displays data that the group ID is being transmitted (ST12).

Figure 11:
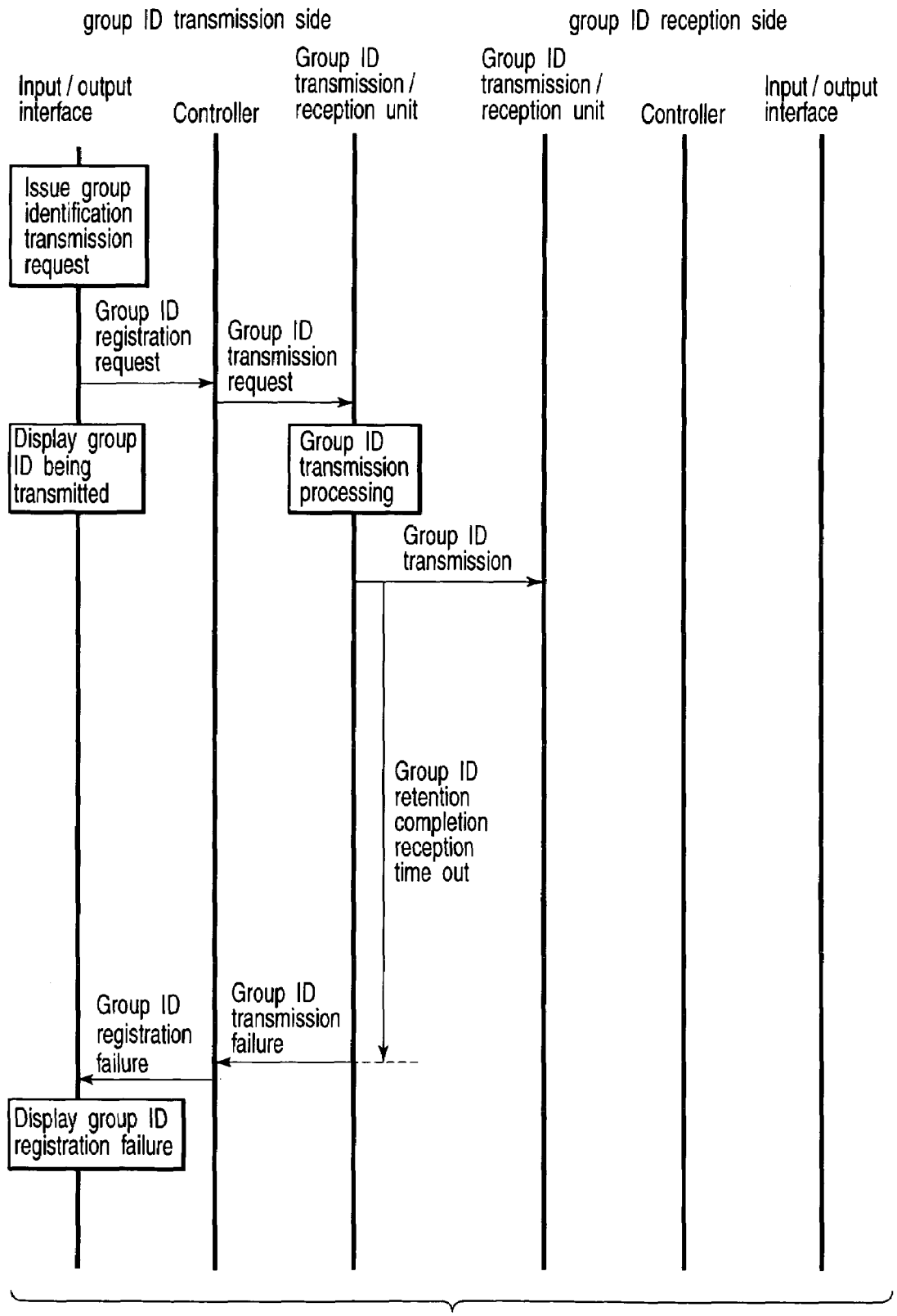
FIG. 11 shows a sequence chart in case registering group ID fails.

When transmitting the group ID, the controller 11-2a judges whether a group ID retention completion notice transmitted from the TV receiver 11 has been received within a predetermined time (ST13). That is, the controller 11-2a increments a standby counter (ST14), and judges whether the standby count has exceeded a predetermined amount (ST15). If the standby count has exceeded a predetermined amount, as shown in FIG. 11, the controller 11-2a makes the display unit 11-2d display information of group ID registration failure (ST16).

On the other hand, in step ST13, if it is determined that the group ID retention completion notice has been received, the group ID transmission/reception unit 11-2f compares the destination address of the received frame and the media access control (MAC) address of the self station. After performing the FCS check, if it is determined that the received frame is intended for the self station, the group ID transmission/reception unit 11-2f sends the received group ID to the controller 11-2a. Furthermore, as shown in FIG. 8, the group ID transmission/reception unit 11-2f transmits a reception completion notice of the group ID retention completion notice to the TV receiver 11 as a source address.

The group ID transmission/reception unit 11-1c of the TV receiver 11, which receives the reception completion notice of the group ID retention completion notice, compares the destination address of the received frame and the MAC address of the self station. After performing the FCS check, if it is determined that the received frame is intended for the self station, the group ID transmission/reception unit 11-1c issues a transmission completion notice of the group ID retention completion notice to the controller 11-1a.

Then, the controller 11-2a compares the group ID included in the received frame and the transmitted group ID (ST17). Then, if the group ID included in the received frame and the transmitted group ID accord with each other, the controller 11-2a transmits a group ID comparison completion notice (ST18). At this time, the command of the transmission frame is set to be "10" indicative of completion.

Then, when receiving a reception completion notice of the group ID comparison completion notice transmitted from the TV receiver 11 (ST19), the group ID transmission/reception unit 11-2f compares the destination address of the received frame and the MAC address of the self station. After performing the FCS check, if it is determined that the received frame is intended for the self station, the group ID transmission/reception unit 11-2f issues a reception completion notice of the group ID comparison completion notice to the controller 11-2a. The controller 11-2a makes the display unit 11-2d display data that registering group ID is completed through the input/output interface 11-2b (ST20), completing the processing.

In contrast, as shown in FIG. 6 and FIG. 10, in step ST17, in case both group ID do not accord with each other, the controller 11-2a generates and transmits a transmission frame indicative of group ID registration failure (ST21). Then, the controller 11-2a makes the display unit 11-2d display information of group ID registration failure through the input/output interface 11-2b (ST16), completing the processing. Furthermore, in step ST19, if the reception completion notice of the group ID comparison completion notice cannot be received, the controller 11-2a makes the display unit 11-2d display information of group ID registration failure through the input/output interface 11-2b (ST16), completing the processing.

<Performance of TV Receiver>

Secondly, with reference to FIG. 7, FIG. 8, and FIG. 9, the performance of the TV receiver 11 will be mainly explained.

In the TV receiver 11, when the switch 11-1f is operated, a group ID registration request signal is issued (ST31). The group ID registration request signal is sent to the controller 11-1a through the input/output interface 11-1b. The controller 11-1a outputs a signal indicative of the state of waiting to receive the group ID in response to the group ID registration request signal. The signal is sent to the display unit 11-1g through the input/output interface 11-1b, and the display unit 11-1g displays information of the state of waiting to receive the group ID (ST32). In this state, it is judged whether group ID transmitted from the remote control unit 11a has been received within a predetermined time (ST33). If the group ID has not been received within a predetermined time, the controller 11-1a makes the display unit 11-1g display information of group ID registration failure (ST34, ST35, ST36), completing the processing.

FIG. 9 shows a sequence chart if registering group ID fails.

As a result, if the group ID has been received within a predetermined time, after confirming that the received frame is correct by performing the FCS check, the group ID transmission/reception unit 11-1c sends thus received group ID to the controller 11-1a. The group ID transmission/reception unit 11-1c generates a transmission frame notifying group ID reception completion in response to the request of the controller 11-1a. The transmission frame includes the received group ID, and the command is set to be "01" indicative of confirmation. The transmission frame is transmitted to the remote control unit 11a (ST37).

Next, the controller 11-1a retains the received group ID in a temporary retention unit (ST38). Then, the controller 11-1a sends a retention completion notice (ST39). That is, the group ID transmission/reception unit 11-1c generates a transmission frame including the received group ID in response to the request of the controller 11-1a. At this time, the command of the transmission frame is set to be "01" indicative of confirmation. The transmission frame is transmitted to the remote control unit 11a as a transmission source.

Then, the controller 11-1a judges whether a group ID comparison completion notice transmitted from the remote control unit 11a has been received within a predetermined time (ST40, ST41, ST42). If the group ID comparison completion notice has not been received within a predetermined time, the controller 11-1a makes the display unit 11-1g display information of group ID registration failure through the input/output interface 11-1b (ST43), completing the processing. Thus, the group ID of the TV receiver 11 is not updated.

On the other hand, if the group ID comparison completion notice has been received within a predetermined time, the group ID transmission/reception unit 11-1c compares the destination address of the received frame and the MAC address of the self station. After performing the FCS check, if it is determined that the received frame is correct and intended for the self station, as shown in FIG. 8, the group ID transmission/reception unit 11-1c sends a reception completion notice of the group ID comparison completion notice to the source address.

Then, the controller 11-1a registers the temporarily retained group ID in the storage unit 11-1d (ST44). Then, the controller 11-1a makes the display unit 11-1g display information of group ID registration completion through the input/output interface 11-1b (ST45), completing the group ID registration performance normally.

In this way, when the group ID is updated, the TV receiver 11 can communicate with other apparatuses having the same group ID using thus updated group ID.

According to above-described embodiment, the user can set up group ID in desired apparatuses using a required remote control unit. Thus, the user can put together desired apparatuses in a group.

Since the group ID to be set up in respective apparatuses is group ID which is stored in respective remote control units when shipped from a plant, it is not necessary to change thus stored group ID. Thus, a keyboard to change group ID is not required, and there is not a fear that group ID which accords with group ID of other groups is accidentally generated when changing the group ID. So, the user can easily change group ID of other apparatuses without taking the group ID into consideration.

In FIG. 1, FIG. 6 to FIG. 10, the configuration and performance are those of the TV receiver 11 and remote control unit 11a. In contrast, the configuration and performance are not restricted to this, and the combination of a remote control unit and a home information appliance is arbitrarily determined.

In the above-described embodiment, the second wireless communication apparatuses are remote control units. In contrast, the second wireless communication apparatuses are not restricted to those, and may be mobile phones provided with infrared light communication capability.

The above-described embodiment is not restricted to home information appliances, and may be applied to electronic apparatuses provided with wireless communication capability.

In the above-described embodiment, a standby counter, and a comparison unit that compares received group ID and transmitted group ID are configured by software. In contrast, those units may be configured by hardware.

Communication between the first wireless communication apparatuses and the second wireless communication apparatuses is not restricted to that employing infrared light, and may be that employing radio. In this way, in communication between the first wireless communication apparatuses and the second wireless communication apparatuses, various frequencies can be used, and group ID can be set up using various frequencies.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a first wireless communication apparatus; and
a second wireless communication apparatus;
the second wireless communication apparatus including:
a storage unit configured to store group identification data set up in advance, the group identification data being a predetermined data set corresponding to the second wireless communication apparatus;
a switch configured to give instructions for changing group identification data;
a transmission/reception unit which transmits group identification data read out from the storage unit to the first wireless communication apparatus to be put together in a group by wireless communication, and receives a setting up completion signal transmitted from the first wireless communication apparatus; and
a control unit which supplies the group identification data from the storage unit to the transmission/reception unit when the switch is operated, the control unit compares the group identification data transmitted from the first wireless communication apparatus and the group identification data stored in the storage unit when the transmission/reception unit receives the setting up completion signal, and confirms the setting up by a comparing result.

2. The apparatus according to claim 1,
wherein the first wireless communication apparatus is a home information appliance provided with communication capability, and the second wireless communication apparatus is a remote control unit that operates the home information appliance.

3. The apparatus according to claim 1,
wherein the first wireless communication apparatus is a home information appliance provided with communication capability, and the second wireless communication apparatus is a mobile phone that operates the home information appliance.

4. The apparatus according to claim 1,
wherein the transmission/reception unit communicates with the first wireless communication apparatus using an infrared light.

5. The apparatus according to claim 1,
wherein the transmission/reception unit employs a communication system conforming to the IEEE 802.11 standard.

6. The apparatus according to claim 1,
wherein the transmission/reception unit is provided with frame generation and frame transmission/reception capability.

7. A wireless communication apparatus comprising:
a plurality of first wireless communication apparatuses which include a first transmission/reception unit and a second transmission/reception unit, and can perform wireless communication mutually using the first transmission/reception unit; and
a second wireless communication apparatus that can perform wireless communication with the second transmission/reception unit of the plural first wireless communication apparatuses;
the second wireless communication apparatus including:
a storage unit configured to store group identification data set up in advance, the group identification data being a predetermined data set corresponding to the second wireless communication apparatus;
a switch configured to give instructions for changing group identification data;
a third transmission/reception unit which transmits group identification data read out from the storage unit to the first wireless communication apparatus to be put together in a group, and receives a setting up completion signal transmitted from the second transmission/reception unit of the first wireless communication apparatus; and
a control unit which, reads out the group identification data from the storage unit to send thus read out group identification data to the third transmission/reception unit when the switch is operated, the control unit compares group identification data transmitted from the second transmission/reception unit and the group identification data stored in the storage unit when the setting up completion signal transmitted from the second transmission/reception unit is received in response to the group identification data output from the third transmission/reception unit, and confirms the setting up by a comparing result.

8. The apparatus according to claim 7,
wherein the first wireless communication apparatus is a home information appliance provided with communication capability, and the second wireless communication apparatus is a remote control unit that operates the home information appliance.

9. The apparatus according to claim 7,
wherein the first wireless communication apparatus is a home information appliance provided with communication capability, and the second wireless communication apparatus is a mobile phone that operates the home information appliance.

10. The apparatus according to claim 7,
wherein the second and third transmission/reception units communicate using infrared light.

11. The apparatus according to claim 7,
wherein the first transmission/reception unit communicates by radio.

12. The apparatus according to claim 7,
wherein the first, second, and third transmission/reception units employ a communication system conforming to the IEEE 802.11 standard.

13. The apparatus according to claim 7, wherein the first, second, and third transmission/reception units are provided with frame generation and frame transmission/reception capability.

14. A wireless transmission system in which a first wireless communication apparatus having a first storage unit and a second wireless communication apparatus having a second storage unit communicate with each other, the system comprising:
- a transmitter for transmitting group identification data stored in the second storage unit in response to group identification request;
- a storage device for temporarily storing the group identification data transmitted from the second wireless communication apparatus in the first storage unit of the first wireless communication apparatus;
- a transmitter for transmitting storage completion data including the group identification data from the first wireless communication apparatus when the group identification data is stored in the first storage unit;
- a comparing device for comparing the group identification data included in the storage completion data and the group identification data stored in the second storage unit when the second wireless communication apparatus receives the storage completion data from the first wireless communication apparatus, and transmitting a comparison completion signal when the both group identification data accord with each other; and
- a register for registering the group identification data stored in the first storage unit when first wireless communication apparatus receives the comparison completion signal.

15. The system according to claim 14,
wherein the first wireless communication apparatus is a home information appliance provided with communication capability, and the second wireless communication apparatus is a remote control unit that operates the home information appliance.

16. The system according to claim 14,
wherein the first wireless communication apparatus is a home information appliance provided with communication capability, and the second wireless communication apparatus is a mobile phone that operates the home information appliance.

17. The system according to claim 14,
wherein the first and second wireless communication apparatuses communicate using infrared light.

18. The system according to claim 14,
wherein the first and second wireless communication apparatuses communicate by radio.

19. The system according to claim 14,
wherein the first and second wireless communication apparatuses employ a communication system conforming to the IEEE 802.11 standard.

20. The system according to claim 14,
wherein the first and second wireless communication apparatuses are provided with frame generation and frame transmission/reception capability.

* * * * *